US012762097B2

(12) United States Patent
Luo et al.

(10) Patent No.: US 12,762,097 B2
(45) Date of Patent: Oct. 13, 2026

(54) MIGRATING DEPLOYMENT INFRASTRUCTURE CONTAINERS ACROSS DIFFERENT DATABASES

(71) Applicant: SAP SE, Walldorf (DE)

(72) Inventors: Jian Luo, Shanghai (CN); Qian Li, Xian (CN); Ivan Veselinov Andreev, Sofia (BG); Joo Yeon Lee, Seoul (KR); Jonathan Bregler, Kraichtal (DE); Simon Lueders, Walldorf (DE); Alexander Bunte, Walldorf (DE); Eunsang Kim, Seoul (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 77 days.

(21) Appl. No.: 17/838,955

(22) Filed: Jun. 13, 2022

(65) Prior Publication Data

US 2023/0401182 A1 Dec. 14, 2023

(51) Int. Cl.
*G06F 16/21* (2019.01)
*G06F 16/23* (2019.01)

(52) U.S. Cl.
CPC .......... *G06F 16/214* (2019.01); *G06F 16/212* (2019.01); *G06F 16/2379* (2019.01)

(58) Field of Classification Search
CPC ... G06F 16/214; G06F 16/2379; G06F 16/212
See application file for complete search history.

(56) References Cited

U.S. PATENT DOCUMENTS

2017/0147311 A1* 5/2017 Bregler ................. G06F 16/212
2017/0323112 A1* 11/2017 Tran ...................... G06F 16/258
2018/0081668 A1* 3/2018 Eberlein ............. H04L 63/0807
2022/0100715 A1 3/2022 Lee et al.

OTHER PUBLICATIONS

SAP, "SAP HANA Developer Guide, HDI Containers," <https://help.sap.com/docs/SAP_HANA_PLATFORM/4505d0bdaf4948449b7f7379d24d0f0d/e28abca91a004683845805efc2bf967c.html?version=1.0.12&locale=en-us>, 3 pages (accessed Apr. 25, 2022).
SAP, "SAP HANA Deployment Infrastructure (HDI) Reference," <https://help.sap.com/doc/e7a49993ba20497f9fa1802b28f81c40/2.0.04/en-US/SAP_HANA_Deployment_Infrastructure_(DI)_Reference_en.pdf>, 300 pages (Oct. 31, 2019).

* cited by examiner

*Primary Examiner* — Apu M Mofiz
*Assistant Examiner* — Husam Turki Samara
(74) *Attorney, Agent, or Firm* — Klarquist Sparkman, LLP

(57) ABSTRACT

Technologies are described for migrating deployment infrastructure containers. Deployment infrastructure containers are used for isolating and deploying related database objects together. Deployment infrastructure containers can store design-time artifacts and run-time artifacts. Deployment infrastructure containers can be migrated using a first migration technique in which catalog objects are migrated from a source database system to a target database system and updated to work in the target database system (e.g., by updating metadata). Deployment infrastructure containers can also be migrated using a second migration technique that migrates design-time artifacts and builds the design-time artifacts at the target database system to re-create the run-time artifacts. Migrated deployment infrastructure containers can be integrated into the target environment, which can include creating new service instances and associating them with the migrated deployment infrastructure containers.

13 Claims, 6 Drawing Sheets

MIGRATING DEPLOYMENT INFRASTRUCTURE CONTAINERS ACROSS DIFFERENT DATABASES

BACKGROUND

Deployment infrastructure containers provide a solution for defining and managing database objects. A deployment infrastructure container is used for isolating and deploying related database objects together. Deployment infrastructure containers simplify the deployment of database objects using declarative design-time artifacts. They also ensure consistent deployment. For example, they can guarantee that multiple objects are deployed in the correct sequence based on their mutual dependencies, and by implementing a transactional all-or-nothing deployment (e.g., as an atomic transaction). In addition, deployment infrastructure containers isolate database objects of an application (or a tenant) securely from other applications (or tenants) even for a multi-application (or multi-tenant) database instance.

In some solutions, existing database tools can be used to migrate database content from one database system to another database system. However, due to the complex nature of deployment infrastructure containers, they can be difficult to migrate or to migrate completely. For example, operational and compatibility issues can occur if a deployment infrastructure container is not migrated and configured correctly for the target environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for migrating deployment infrastructure containers. For example, a command can be received to migrate a deployment infrastructure container from a source database system to a target database system, and responsive to the command, the deployment infrastructure container can be migrated. The migration can be performed by migrating catalog objects from the source database system to the target database system and updating the migrated catalog objects at the target database system, comprising updating metadata associated with the migrated catalog objects at the target database system. Migration can further comprise creating a new service instance for the migrated deployment infrastructure container and associating the new service instance with the migrated deployment infrastructure container at the target database system.

As another example, a deployment infrastructure container can be migrated by creating a new deployment infrastructure container at a target database system, migrating design-time artifacts from the deployment infrastructure container at a source database system to the new deployment infrastructure container at the target database system, performing a build operation that creates run-time artifacts within the new deployment infrastructure container from the design-time artifacts that were migrated to the new deployment infrastructure container, and associating a cloud application with the new deployment infrastructure container at the target database system.

DETAILED DESCRIPTION

Overview

Figure 1:
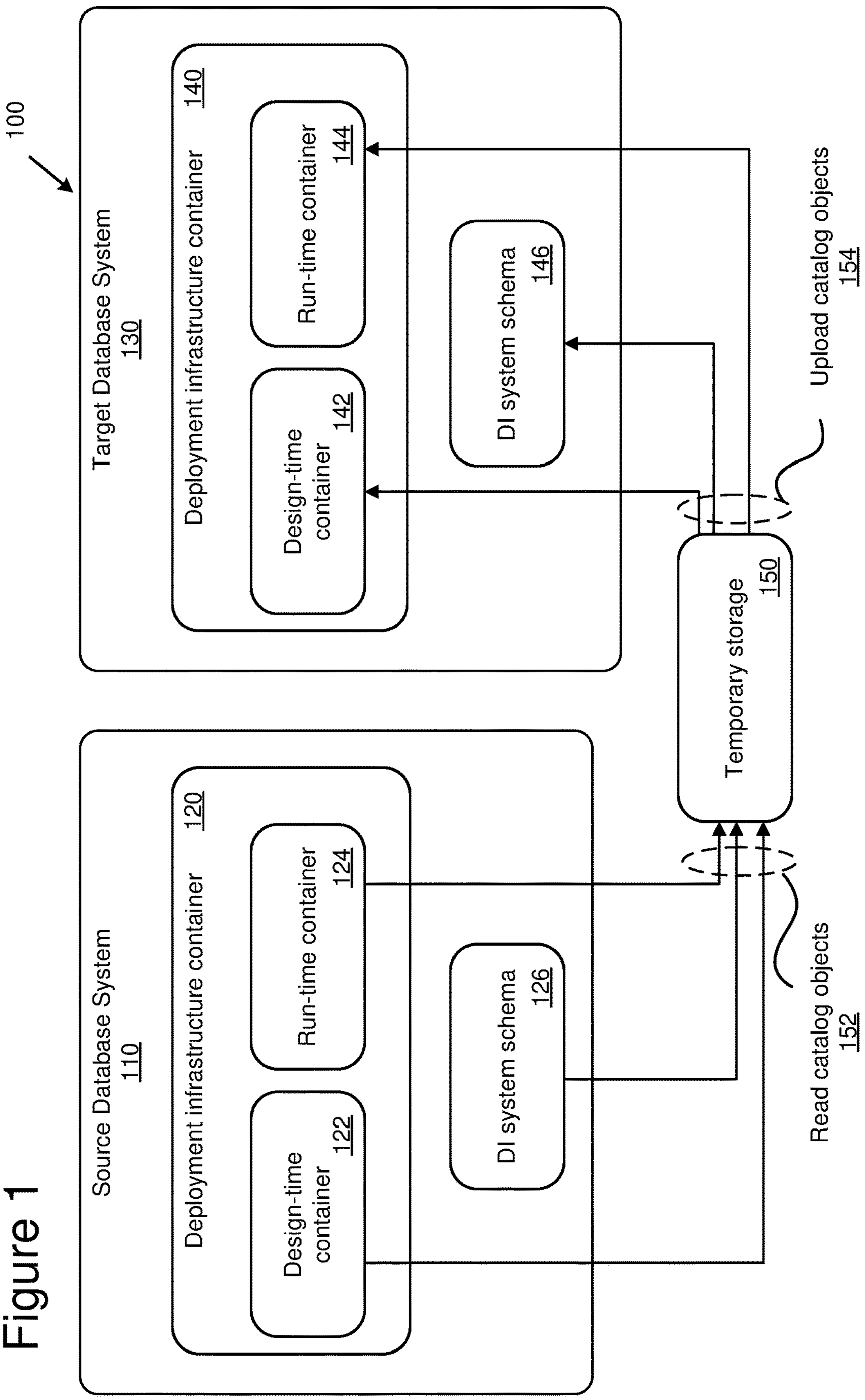
FIG. 1 depicts a first migration technique for migrating deployment infrastructure containers from a source database system to a target database system.

The following description is directed to technologies for migrating deployment infrastructure containers. Deployment infrastructure containers are used for isolating and deploying related database objects together. Deployment infrastructure containers store design-time artifacts (e.g., in design-time containers) and run-time artifacts (e.g., in run-time containers). Deployment infrastructure containers can be migrated using a first migration technique that operates at the database metadata level. According to the first migration technique, catalog objects are migrated from a source database system to a target database system and updated to work in the target database system (e.g., by updating metadata). Deployment infrastructure containers can also be migrated using a second migration technique that migrates design-time artifacts and builds the design-time artifacts at the target database system to re-create the run-time artifacts. With either migration technique, the deployment infrastructure container can be integrated into the target environment (e.g., a cloud application environment), which can include creating new service instances, associating cloud applications with the new service instances (e.g., and providing credentials for access), and/or associating the new service instances with the migrated deployment infrastructure containers.

Example Deployment Infrastructure Containers

In the technologies described herein, deployment infrastructure (DI) containers are used for migrating database related objects (e.g., artifacts, schemas, metadata, etc.) between database systems. In general, a deployment infrastructure container is used for isolating and deploying related database objects together. Deployment infrastructure containers simplify the deployment of database objects using declarative design-time artifacts. They also ensure consistent deployment. For example, they can guarantee that multiple objects are deployed in the correct sequence based on their mutual dependencies, and by implementing a transactional all-or-nothing deployment (e.g., as an atomic transaction). In addition, deployment infrastructure containers isolate database objects of an application (or a tenant) securely from other applications (or tenants) even for a multi-application (or multi-tenant) database instance. One type of deployment infrastructure container is an SAP HANA® Deployment Infrastructure (HDI) container, which is used in SAP HANA database environments.

A deployment infrastructure container stores two main types of information. First, a deployment infrastructure container stores design-time artifacts (e.g., as source code files). The design-time artifacts are used to specify the database artifacts that can be deployed. Some artifact types that can be stored as design-time artifacts include schema table views, calculation views, machine learning code, database table data, etc. The design-time artifacts are stored in a design-time container (also referred to as a design-time sub-container or a design-time schema) within the deployment infrastructure container.

Second, a deployment infrastructure container stores run-time artifacts. Run-time artifacts are the deployed database objects that are built according to the design-time artifacts. The run-time artifacts are stored in a run-time container (also referred to as a run-time sub-container or a run-time schema) within the deployment infrastructure container.

Deployment infrastructure containers can be associated with one or more database users, which can be assigned various permissions for working with the deployment infrastructure containers. In some implementations, each deployment infrastructure container is associated with two users, a first user for the design-time artifacts and a second user for the run-time artifacts.

Deployment infrastructure containers can also be created and associated with a cloud platform (e.g., a platform-as-a-service) that provides application development and integration. One example cloud platform within which deployment infrastructure containers can be utilized is the Cloud Foundry platform (Cloud Foundry is provided by the Cloud Foundry Foundation).

In some implementations, the deployment procedure for a deployment infrastructure container comprises the following operations. First, a modeling operation is performed in which a database application developer describes the database catalog objects using a set of text files, where the text files use a predefined syntax according to the deployment infrastructure container artifact types. Second, as an upload (or write) operation, the application developer uploads the design-time artifact files to the target database system. Then, the uploaded files are stored in a staging location (e.g., a virtual file) of the deployment infrastructure container for the application being deployed. Third, as a build (or make) operation, the deployment infrastructure server reads the uploaded design-time artifacts and generates a set of SQL statements that will be used for creating the corresponding run-time database objects. Fourth, as a deploy operation, the generated set of SQL statements are executed against the target database system in a single atomic transaction boundary, which creates a set of database catalog objects in the run-time container of the deployment infrastructure container.

Example Migration of Deployment Infrastructure Containers

In the technologies described herein, deployment infrastructure containers can be migrated between database systems. For example, deployment infrastructure containers can be migrated from a first (source) database system (e.g., a legacy database system) to a second (target) database system (e.g., a cloud database system).

According to a first migration technique, the deployment infrastructure container is migrated at the database metadata level. For example, the database catalog objects are migrated from the source database system to the target database system, including catalog object metadata for the design-time container and the run-time container, container schemas, and user information. Once at the target database system, the deployment infrastructure container metadata is updated to work with the target database system.

FIG. 1 depicts a first migration technique 100 for migrating deployment infrastructure containers from a source database system 110 to a target database system 130. The source database system 110 contains deployment infrastructure container 120. For example, the deployment infrastructure container 120 could be an HDI or another type of deployment infrastructure container. The deployment infrastructure container 120 comprises a design-time container 122 (storing design-time artifacts) and a run-time container 124 (storing run-time artifacts). The source database system 110 also stores DI system schema 126. The DI system schema 126 contains information (e.g., users, privileges, roles, version information, container groups, etc.) about the deployment infrastructure containers (such as deployment infrastructure container 120) stored at the source database system 126. In general, a database system (such as the source database system 110 or the target database system 130) can store any number of deployment infrastructure containers.

According to the first migration technique 100, the catalog objects (including catalog object metadata) are migrated from the source database system 110 to the target database system 130. Specifically, catalog objects for the design time container 122, catalog objects for the run-time container 124, and the DI system schema 126 are read from the source database system 110, as depicted at 152. The catalog objects are then uploaded to the target database system 130, as depicted at 154. In some implementations, the catalog objects are stored in temporary storage 150 (e.g., cloud blob storage) to facilitate the migration from the source database system 110 to the target database system 130. However, in other implementations, the catalog objects can be migrated directly from the source database system 110 to the target database system 130.

In some situations, the migrated catalog objects may not be fully compatible with the target database system 130. In these situations, the migrated catalog objects are modified so that they are compatible with the target database system 130. Such modification can include updating catalog object metadata and/or DI system schema information to be compatible with the software versions associated with the target database system 130. Such modification can also include updating a container format of the migrated deployment infrastructure container 140 to be compatible with the target database system 130.

In some implementations, the catalog objects have a persistent version field. The persistent version field indicates the physical and logical format of the deployment infrastructure container catalog object metadata. Once the deployment infrastructure container is migrated to the target database system, the persistent version field will be compared to a persistent version associated with the target database system, and the deployment infrastructure container catalog object metadata will be upgraded if needed (e.g., if its version is older than the persistent version associated with the target database system). In some implementations, migration of the deployment infrastructure container will trigger a restart at the target database system (e.g., performed by the deployment infrastructure server). Upon restarting (e.g., as part of the startup procedure), the persistent version field is checked, and the catalog object metadata is updated when the version is older than the persistent version associated with the target database system.

In some implementations, migrating the catalog objects from the source database system 110 to the target database system 130 comprises migrating a design-time schema from the design-time container 122 to the design-time container 142, migrating a run-time schema from the run-time container 124 to the run-time container 144, migrating the DI system schema 126 to the DI system schema 146, and migrating associated user information (e.g., technical users).

According to a second migration technique, the design-time artifacts of the deployment infrastructure container are copied from the source database system to the target database system and re-deployed. For example, the design-time artifacts can be copied directly from the source database system to the target database system, or via a temporary storage facility. Once at the target database system, the design-time artifacts can be built to re-create the run-time artifacts at the target database system.

Figure 2:
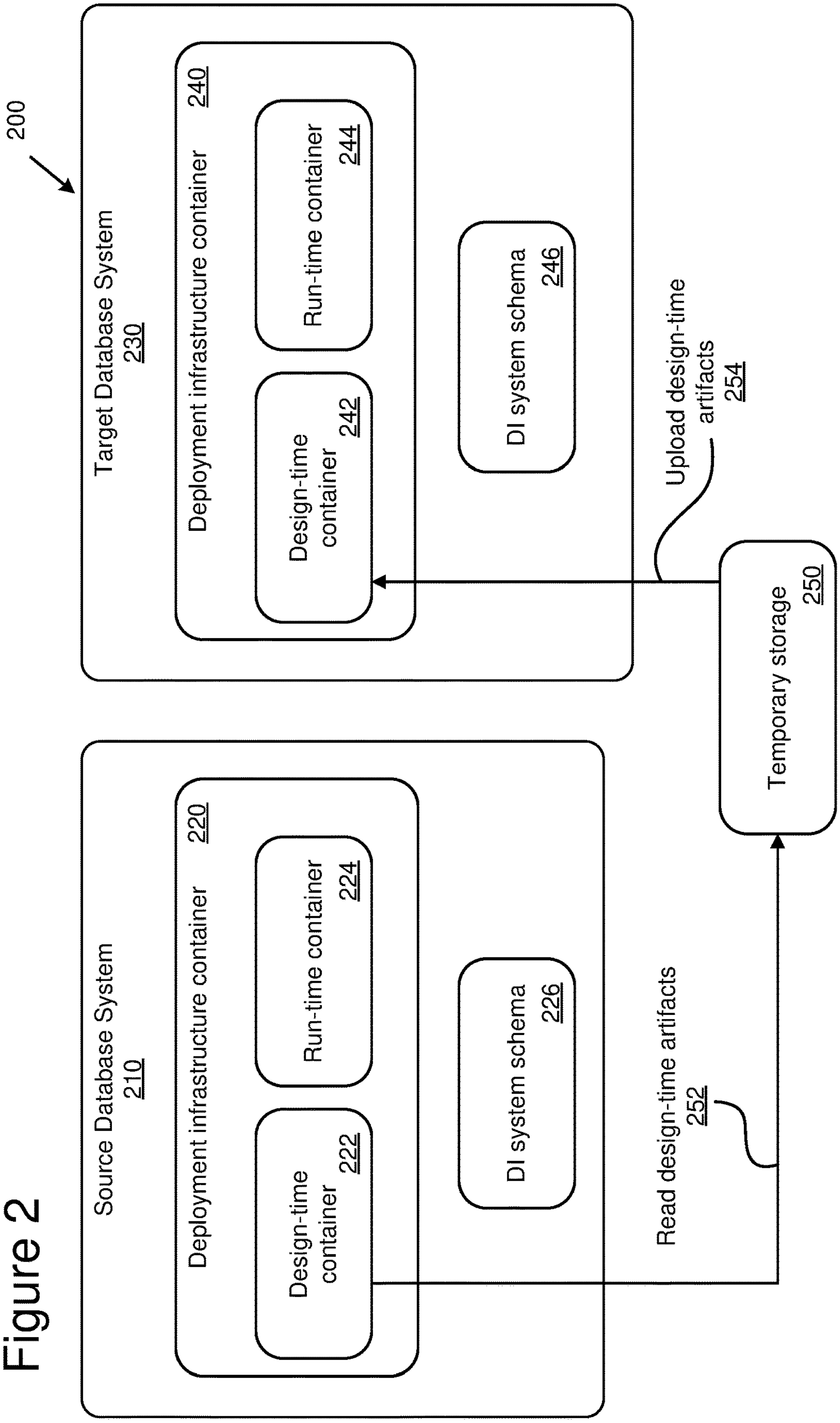
FIG. 2 depicts a second migration technique for migrating deployment infrastructure containers from a source database system to a target database system.

FIG. 2 depicts a second migration technique 200 for migrating deployment infrastructure containers from a source database system 210 to a target database system 230. The source database system 210 contains deployment infrastructure container 220. For example, the deployment infrastructure container 220 could be an HDI or another type of deployment infrastructure container. The deployment infrastructure container 220 comprises a design-time container 222 (storing design-time artifacts) and a run-time container 224 (storing run-time artifacts). The source database system 210 also stores DI system schema 226. The DI system schema 226 contains information (e.g., users, privileges, roles, version information, container groups, etc.) about the deployment infrastructure containers (such as deployment infrastructure container 220) stored at the source database system 226. In general, a database system (such as the source database system 210 or the target database system 230) can store any number of deployment infrastructure containers.

According to the second migration technique 200, the design-time artifacts from the design-time container 220 are read and saved to temporary storage 250 (e.g., cloud blob storage), as depicted at 252. The design-time artifacts are then uploaded from the temporary storage 250 to a design-time container 242 of a corresponding deployment infrastructure container 240 (which is also referred to as the migrated deployment infrastructure container) at the target database system 230, as depicted at 254. For example, the corresponding deployment infrastructure container 240 (along with its design-time container 242 and run-time container 244) can be created at the target database system 230 in response to the migration (e.g., triggered by a manually or automatically initiated migration procedure). The run-time artifacts are then generated in the run-time container 244 of the deployment infrastructure container 240 at the target database system 230 using the design-time artifacts that were uploaded to the design-time container 242. For example, the run-time artifacts can be generated in the run-time container 244 using a make or build operation. The target database system 230 also stores a DI system schema 246 that contain information about the deployment infrastructure containers (such as deployment infrastructure container 240) stored at the target database system 230.

In some implementations, the following operations are performed to carry out the second migration technique (e.g., for performing second migration technique 200).

Operation 1. Each of the deployment infrastructure containers to be migrated from the source database system (e.g., from source database system 210) are identified and the following operations 2-8 are performed for each. If the deployment infrastructure container is an HDI container, then the HDI system view can be accessed to identify the HDI containers.

Operation 2. A new empty deployment infrastructure container (e.g., deployment infrastructure container 240) is created at the target database system (e.g., at target database system 230). The new empty development infrastructure container is assigned the same name as the original deployment infrastructure container at the source database system. If the deployment infrastructure container is an HDI container, then a "create container" HDI procedure can be used to create an empty HDI container.

Operation 3. The deployed design-time artifacts in the deployment infrastructure container (e.g., deployment infrastructure container 220) at the source database system are exported. In some implementations, the design-time artifacts are exported to a temporary database table T, as a staging database table (e.g., to more efficiently store and move the design-time artifacts, which can comprise many individual files). If the deployment infrastructure container is an HDI container, then a built-in export procedure can be used.

Operation 4. The exported design-time artifacts are exported to temporary storage (e.g., to a cloud storage provider), such as temporary storage 250. When a temporary table T is used, then the temporary table T is exported to temporary storage.

Operation 5. The exported design time artifacts are imported from temporary storage (e.g., from the cloud storage provider) to the target database system. When a temporary table T is used, the temporary table T is imported to the target database system.

Operation 6. The imported design-time artifacts are loaded into a design-time container of the deployment infrastructure container created in operation 2. If the deployment infrastructure container is an HDI container, then a "container import" HDI procedure can be used to load the design-time artifacts.

Operation 7. Run-time database objects are created at the target database system (in a run-time container of the deployment infrastructure container) by deploying the design-time artifacts loaded at Operation 6. The DI system schema at the target database system is also updated.

Operation 8. Cleanup operations are performed to remove any temporary data, such as the design-time artifacts stored in temporary storage. For example, if temporary table T was used, it is dropped during this operation.

In some implementations, such as implementations that are migrating HDI containers, migration of the deployment infrastructure containers is performed as part of an overall migration procedure. The overall migration procedure performs a catalog migration phase, followed by a phase that migrates the deployment infrastructure containers, and finally a data migration phase (including migrating the database tables belonging to the deployment infrastructure containers).

Example Environments for Migrating Deployment Infrastructure Containers

In the technologies described herein, environments can be provided for migrating deployment infrastructure containers from a source database system to a target database system. In some implementations, the target database system is part of a cloud environment in which cloud applications access the migrated deployment infrastructure containers.

Figure 3:
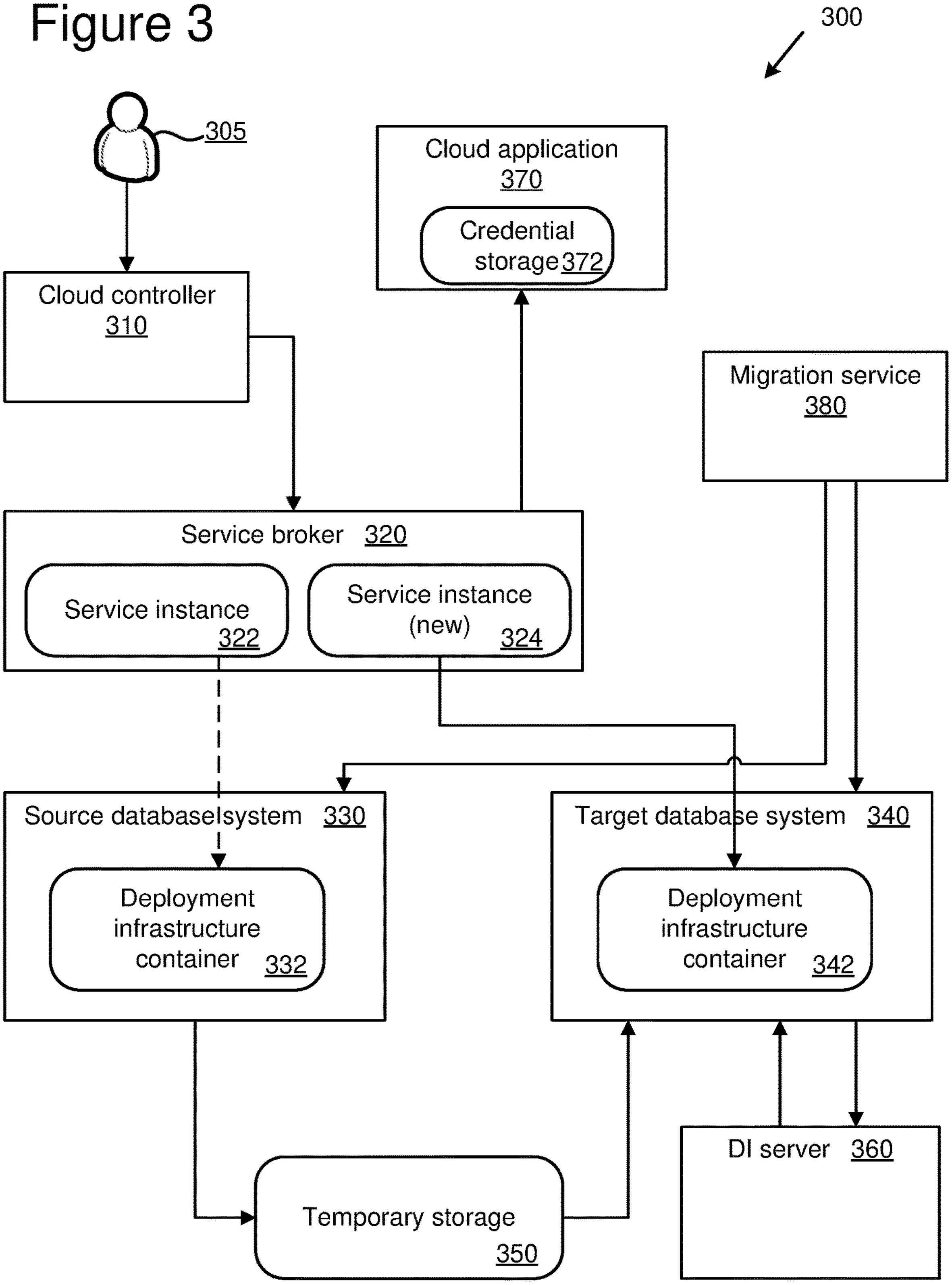
FIG. 3 depicts an example environment within which deployment infrastructure containers are migrated.

FIG. 3 depicts an example environment 300 within which deployment infrastructure containers are migrated. The example environment 300 is an environment that supports applications (apps) running in the cloud. In some implementations, the example environment 300 is implemented, at least in part, using Cloud Foundry.

To illustrate migration of deployment infrastructure containers, the example environment 300 depicts a source database system 330 and a target database system 340. An example deployment infrastructure container 332 at the source database system 330 is being migrated to the target database system 340 (the migrated deployment infrastructure container is depicted at 342). In some implementations, migration is performed via temporary storage 350. Migration of the deployment infrastructure container can be performed using the first migration technique (e.g., as depicted in FIG. 1) or the second migration technique (e.g., as depicted in FIG. 2).

The example environment 300 also includes DI server 360. The DI server 360 performs operations for managing deployment infrastructure containers stored at the target database system 340. For example, If the deployment infrastructure container 342 was migrated using the first migration technique, then the DI server 360 performs various update operations so that the migrated deployment infrastructure container is compatible with the target database system 340 and/or the example environment 300 in general (e.g., updating catalog object metadata and/or DI system schema information). If deployment infrastructure container 342 was migrated using the second migration technique, then the DI server 360 re-deploys the design-time artifacts to create run-time artifacts within the deployment infrastructure container 342.

The example environment 300 also includes service broker 320. The service broker 320 maintains the service instances. In this example, prior to the migration, service instance 322 was associated with deployment infrastructure container 332 located at the source database system 330. As part of the migration process, new service instance 324 is created within the service broker 320. The new service instance 324 is associated with the migrated deployment infrastructure container 342 located at the target database system 340. The service broker 320 also facilitates communication between the cloud application 370 and the service instance that is bound to the cloud application 370.

During a first phase of the migration, the migration service 380 controls migration of the deployment infrastructure container 332 from the source database system 330 to the second database system 340, where it is stored as migrated deployment infrastructure container 342. During a second phase of the migration, the DI server 360 updates the migrated deployment infrastructure container 342 depending on whether the migration was performed according to the first migration technique or the second migration technique. During a third phase of the migration, the new service instance 324 is created and associated with the migrated deployment infrastructure container 342 at the target database system 340. During a fourth phase of the migration, the cloud application 370 is bound to the new service instance 324. In some implementations, binding the cloud application 370 to the new service instance 324 comprises creating credentials (e.g., for a new user account, such as a technical user) which are stored in credential storage 372 at the cloud application 370. The stored credentials are then used by the cloud application 370 when accessing the deployment infrastructure container 342 via the new service instance 324.

In some implementations, the first, second, and third migration phases are controlled by the migration service 380, while the fourth migration phase is initiated, at least in part, by a user 305 (e.g., an administrator) that accesses a cloud controller 310. However, in other implementations, various migration phases can be manually or automatically initiated or managed.

Methods for Migrating Deployment Infrastructure Containers

In the technologies described herein, methods can be provided for migrating deployment infrastructure containers. Migration can be performed according to the first migration technique and/or the second migration technique. Migration can be performed from a source database system to a target database system (e.g., to a database system running in a cloud environment that supports cloud applications).

Figure 4:
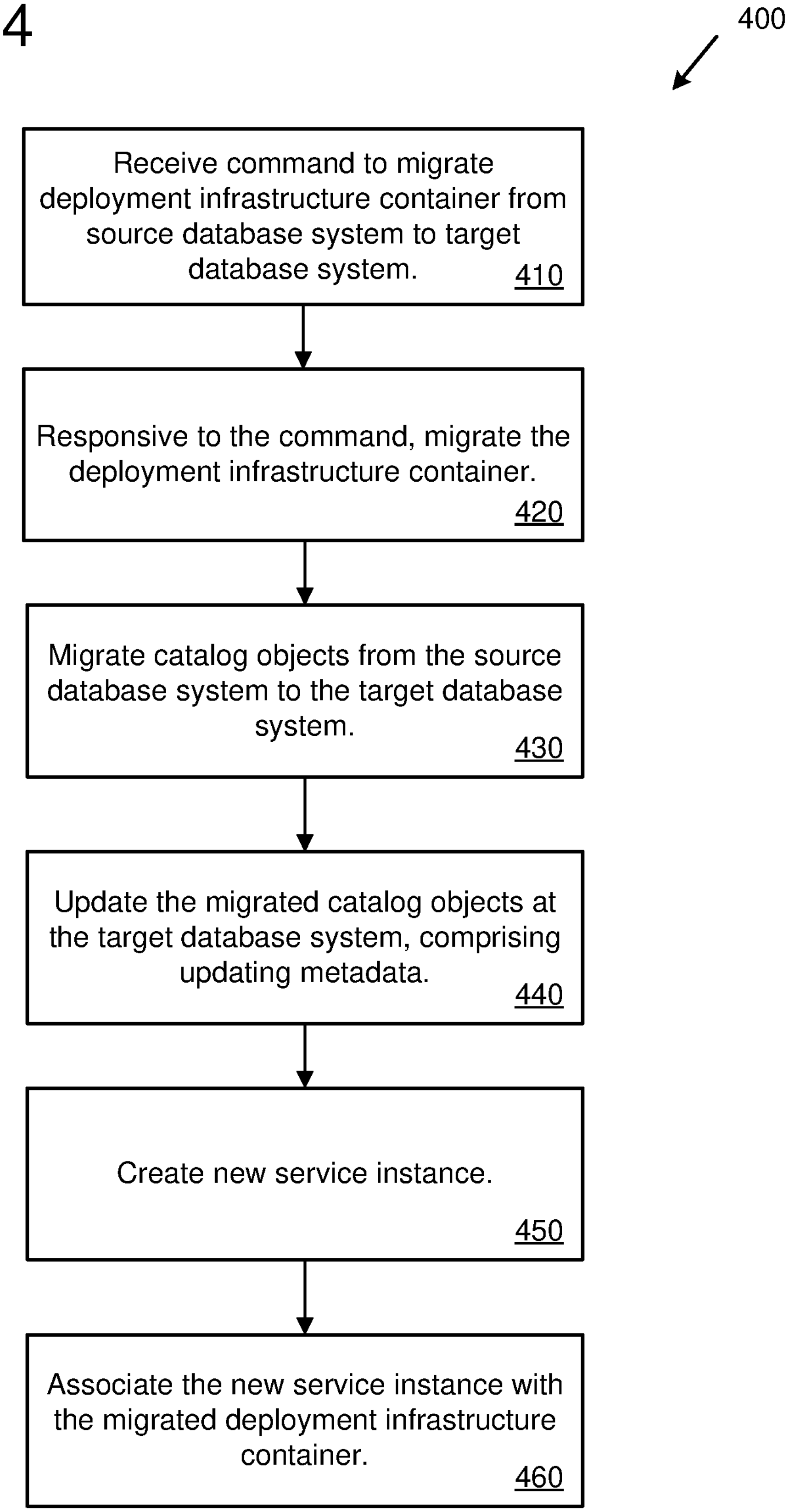
FIG. 4 is a flowchart of an example process for migrating deployment infrastructure containers, including migrating catalog objects.

FIG. 4 is a flowchart of an example process 400 for migrating deployment infrastructure containers, including migrating catalog objects. For example, the example process 400 can be used to migrate deployment infrastructure containers as illustrated in FIG. 1. At 410, a command is received to migrate a deployment infrastructure container from a source database system to a target database system. For example, the command can be received from a user or initiated by an automated process.

At 420, responsive to the received command, the deployment infrastructure container is migrated. Migration comprises performing the operations described at 430 and 440. At 430, catalog objects are migrated from the source database system to the target database system. At 440, the migrated catalog objects are updated at the target database system. Updating the migrated catalog objects comprises updating metadata associated with the migrated catalog objects at the target database system.

At 450, a new service instance is created for the migrated deployment infrastructure container at the target database system. For example, the new service instance can be created by a service broker.

At 460, the new service instance is associated with the migrated deployment infrastructure container. The new service instance can also be associated with a cloud application that accesses the migrated deployment infrastructure container via the new service instance.

Figure 5:
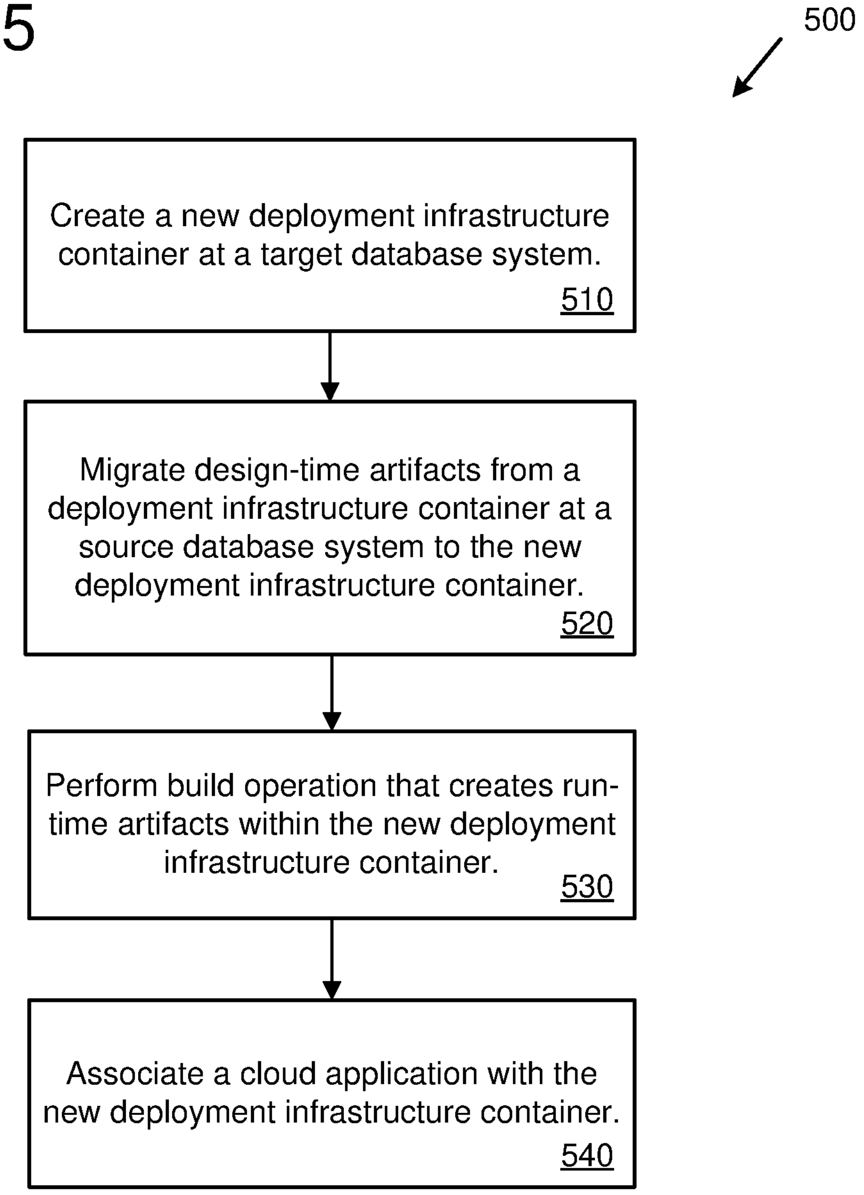
FIG. 5 is a flowchart of an example process for migrating deployment infrastructure containers, including migrating design-time artifacts.

FIG. 5 is a flowchart of an example process 500 for migrating deployment infrastructure containers, including migrating design-time artifacts. For example, the example process 500 can be used to migrate deployment infrastructure containers as illustrated in FIG. 2. At 510, a new deployment infrastructure container is created at a target database system. The new deployment infrastructure container can be an empty deployment infrastructure container with the same name as a deployment infrastructure container that is being migrated from a source database system.

At 520, design-time artifacts are migrated from the deployment infrastructure container at the source database system to the new deployment infrastructure container. The design-time artifacts can be migrated from a design-time container of the deployment infrastructure container to a design-time container of the new deployment infrastructure container. In some implementations, the migration is performed by first copying the design-time artifacts to temporary storage (e.g., to cloud storage) and then to the new deployment infrastructure container.

At 530, a build operation is performed that creates run-time artifacts within the new deployment infrastructure container. The run-time artifacts are created from the design-time artifacts that were migrated to the new deployment infrastructure container. The run-time artifacts can be stored within a run-time container of the new deployment infrastructure container.

At 540, a cloud application is associated with the new deployment infrastructure container at the target database system. In some implementations, credentials are created for use by the cloud application in accessing the new deployment infrastructure container at the target system and the credentials are stored at the cloud application.

Computing Systems

Figure 6:
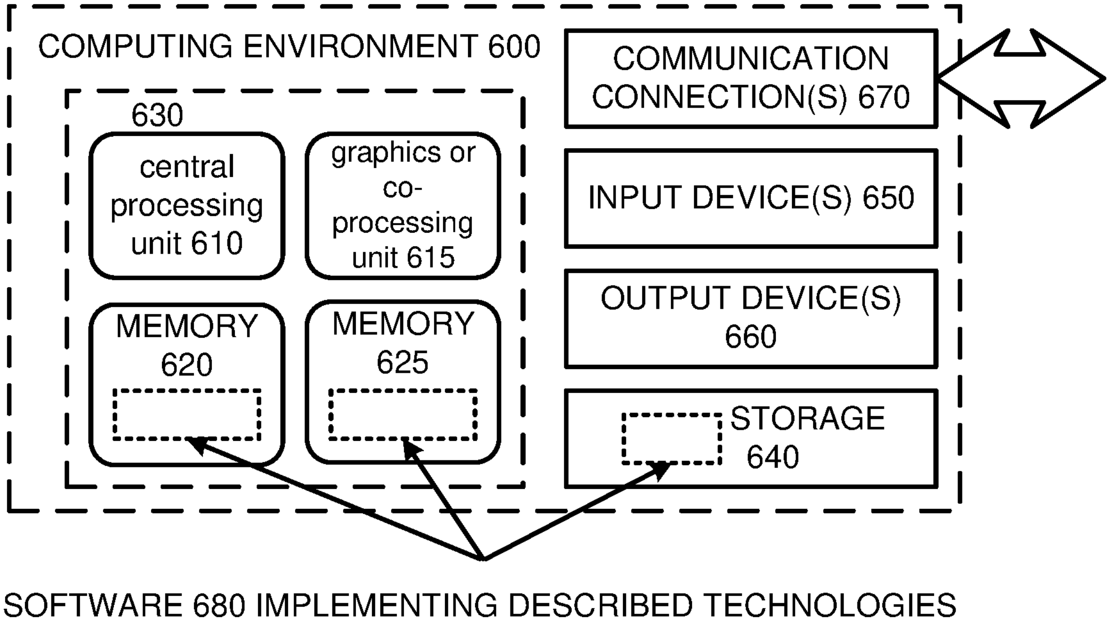
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
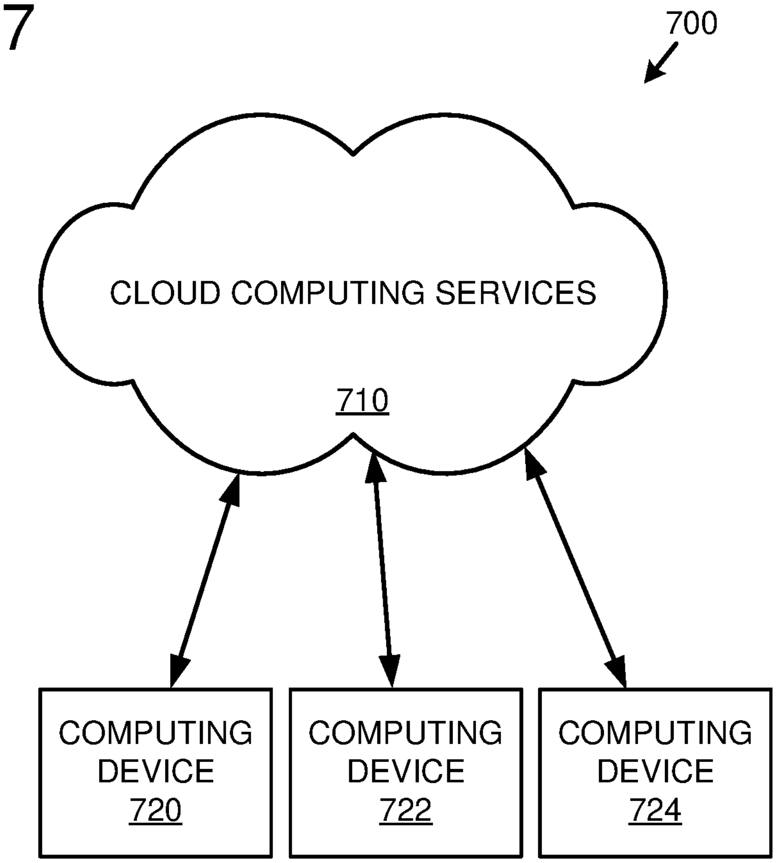
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for migrating deployment infrastructure containers, the method comprising:

receiving a command to migrate a deployment infrastructure container comprising a design-time container storing design-time artifacts and a run-time container storing run-time artifacts from a source database system to a target database system;

responsive to the command, migrating the deployment infrastructure container from the source database system to the target database system, comprising:

migrating catalog objects from the source database system to the target database system, the catalog objects comprising catalog object metadata for the design-time container and the run-time container, a design-time schema associated with the design-time container, a run-time schema associated with the run-time container, and a system schema for the deployment infrastructure container; and updating the migrated catalog objects at the target database system, comprising updating the migrated catalog object metadata at the target database system;

creating a new service instance for the migrated deployment infrastructure container; and associating the new service instance with the migrated deployment infrastructure container at the target database system, wherein updating the migrated catalog object metadata at the target database system comprises:

comparing a persistent version field of the migrated catalog objects to a persistent version associated with the target database system, wherein the persistent version field indicates a physical and logical format of the migrated catalog object metadata;

determining that a version of the migrated catalog objects is older than the persistent version associated with the target database;

and responsive to the determination, updating the migrated catalog object metadata.

2. The method of claim 1, wherein migrating the catalog objects from the source database system to the target database system further comprises:

migrating user information representing users associated with the deployment infrastructure container from the source database system to the target database system.

3. The method of claim 1, wherein updating the migrated catalog object metadata at the target database system comprises re-writing metadata in the design-time schema of the migrated deployment infrastructure container.

4. The method of claim 1, wherein updating the migrated catalog objects at the target database system comprises updating a container format of the migrated deployment infrastructure container to be compatible with the target database system.

5. The method of claim 1, wherein migrating the catalog objects from the source database system to the target database system comprises:

copying the catalog objects from the source database system to temporary storage;

and copying the catalog objects from the temporary storage to the target database system.

6. The method of claim 1, further comprising:

creating credentials for use by a cloud application in accessing the migrated deployment infrastructure container; and storing the credentials at the cloud application.

7. The method of claim 1, wherein the source database system is a legacy database system and wherein the target database system is a cloud database system.

8. One or more computing devices comprising:

processors; and memory;

the one or more computing devices configured, via computer-executable instructions, to perform operations for migrating deployment infrastructure containers, the operations comprising:

receiving a command to migrate a deployment infrastructure container comprising a design-time container storing design-time artifacts and a run-time container storing run-time artifacts from a source database system to a target database system;

responsive to the command, migrating the deployment infrastructure container from the source database system to the target database system, comprising:

migrating catalog objects from the source database system to the target database system, the catalog objects comprising catalog object metadata for the design-time container and the run-time container, a design-time schema associated with the design-time container, a run-time schema associated with the run-time container, and a system schema for the deployment infrastructure container; and updating the migrated catalog objects at the target database system, comprising updating the migrated catalog object metadata at the target database system;

creating a new service instance for the migrated deployment infrastructure container; and associating the new service instance with the migrated deployment infrastructure container at the target database system, wherein updating the migrated catalog object metadata at the target database system comprises:

comparing a persistent version field of the migrated catalog objects to a persistent version associated with the target database system, wherein the persistent version field indicates a physical and logical format of the migrated catalog object metadata;

determining that a version of the migrated catalog objects is older than the persistent version associated with the target database;

and responsive to the determination, updating the migrated catalog object metadata.

9. The one or more computing devices of claim 8, wherein migrating the catalog objects from the source database system to the target database system further comprises:

migrating user information representing users associated with the deployment infrastructure container from the source database system to the target database system.

10. The one or more computing devices of claim 8, wherein updating the migrated catalog object metadata at the target database system comprises re-writing metadata in the design-time schema of the migrated deployment infrastructure container.

11. The one or more computing devices of claim 8, wherein updating the migrated catalog objects at the target database system comprises updating a container format of the migrated deployment infrastructure container to be compatible with the target database system.

12. The method of claim 1, further comprising:

with a deployment infrastructure server, performing one or more update operations so that the migrated deployment infrastructure container is compatible with the target database system, the one or more update operations comprising the updating of the migrated catalog objects at the target database system and updating the migrated system schema at the target database system.

13. The method of claim 1, wherein the migration of the deployment infrastructure containers is performed as part of an overall migration procedure, the overall migration procedure comprising a catalog migration phase followed by a phase that migrates the deployment infrastructure containers and a data migration phase in which database tables belonging to the deployment infrastructure containers are migrated.

* * * * *